(12) United States Patent
Virdy (10) Patent No.: US 9,600,534 B2
(45) Date of Patent: *Mar. 21, 2017

(54) RESOLVING QUERIES BASED ON AUTOMATIC DETERMINATION OF REQUESTOR GEOGRAPHIC LOCATION

(71) Applicant: Microsoft Technology Licensing, LLC, Redmond, WA (US)

(72) Inventor: Ajaipal Singh Virdy, Leesburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,657

(22) Filed: Jun. 12, 2015

(65) Prior Publication Data
US 2015/0278227 A1    Oct. 1, 2015

Related U.S. Application Data

(63) Continuation of application No. 13/453,920, filed on Apr. 23, 2012, now Pat. No. 9,058,395, which is a continuation of application No. 12/846,329, filed on Jul. 29, 2010, now Pat. No. 8,166,025, which is a continuation of application No. 12/176,660, filed on Jul. 21, 2008, now Pat. No. 7,774,342, which is a continuation of application No. 10/448,275, filed on May 30, 2003, now Pat. No. 7,403,939.

(51) Int. Cl.
G06F 17/30    (2006.01)

(52) U.S. Cl.
CPC ...... *G06F 17/3053* (2013.01); *G06F 17/3087* (2013.01); *G06F 17/30241* (2013.01); *G06F 17/30864* (2013.01)

(58) Field of Classification Search
CPC ..................... G06F 17/3087; G06F 17/30864
USPC ........................................ 707/724, 728, 730
See application file for complete search history.

(56) References Cited

U.S. PATENT DOCUMENTS

| | | | | |
|---|---|---|---|---|
| 2003/0061211 | A1* | 3/2003 | Shultz et al. | 707/3 |
| 2004/0139107 | A1* | 7/2004 | Bachman et al. | 707/104.1 |
| 2004/0199623 | A1* | 10/2004 | Houri | 709/223 |
| 2004/0260604 | A1* | 12/2004 | Bedingfield, Sr. | 705/14 |
| 2006/0155873 | A1* | 7/2006 | Twata et al. | 709/240 |
| 2007/0124296 | A1* | 5/2007 | Toebes | 707/5 |

OTHER PUBLICATIONS

Sato et al., Distributed information retrieval by using coorperative meta search engines, 2001, IEEE 345-350.*

* cited by examiner

*Primary Examiner* — Jean B Fleurantin
(74) *Attorney, Agent, or Firm* — Michael Kondoudis; The Law Office of Michael E. Kondoudis (57) ABSTRACT

Resolving a query term includes receiving at least one query term from a requestor and determining a geographic location of the requestor. The geographic location of the requestor may be determined by accessing an electronic information store containing a requestor profile including geographic information about the requestor, where the requestor profile is used by more than one program. The query term is resolved against electronic information within at least one electronic information store to determine whether one or more matches exist and a result is generated that accounts for the geographic location of the requestor.

16 Claims, 6 Drawing Sheets

RESOLVING QUERIES BASED ON AUTOMATIC DETERMINATION OF REQUESTOR GEOGRAPHIC LOCATION

TECHNICAL FIELD

This document relates to resolving queries based on the automatic determination of a requestor's geographic location.

BACKGROUND

With the increased amount of information available over the Internet, it has become more difficult to limit the results of a search on the Internet to information that is useful to the person conducting the search. Frequently, when a search is performed, the most useful and relevant results may be scattered and buried among many less relevant results.

SUMMARY

In one general aspect, resolving a query term includes receiving at least one query term from a requestor and determining a geographic location of the requestor. The geographic location of the requestor may be determined by accessing an electronic information store containing a requestor profile including geographic information about the requestor, where the requestor profile is used by more than one program. The query term is resolved against electronic information within at least one electronic information store to determine whether one or more matches exist and a result is generated that accounts for the geographic location of the requestor.

Implementations may include one or more of the following features. For example, the requestor profile may be used by more than one program type. The requestor profile may have been created for a purpose other than determining the geographic location of the requestor to resolve the query term. A requestor search profile may be built by automatically obtaining geographic information about the requestor from the requestor profile.

The query term and the geographic location of the requestor may be resolved against the electronic information within at least one electronic information store to determine whether one or more matches exist. The geographic location of the requestor may be determined without soliciting geographic location information from the requestor for purposes of resolving the query term. The geographic location of the requestor may be determined by determining an Internet Protocol (IP) address for the requestor and determining the geographic location of the requestor based on the IP address.

The geographic information related to the requestor may include a zip code. The geographic location of the requestor may be determined by determining a geocode based on the geographic location the requestor and the geocode may be associated with the requestor. The geocode may be used to broaden and/or narrow a geographic scope of the query term resolution. The requestor may disable the geocode.

A display of the results may be organized based on the geographic location of the requestor. The electronic information may be filtered based on the geographic location of the requestor and the query term may be resolved against the filtered electronic information to determine whether one or more matches exist. Subcategories appropriate for the geographic location of the requestor may be selected. The matches may be filtered to account for the geographic location of the requestor. A display of the filtered results may be organized based on the geographic location of the requestor. The results may be displayed in a visually-perceivable manner on a user interface.

Keyword resolution may be performed using a query term. Keyword resolution may be performed using the query term and the geographic location of the requestor.

The requestor may override the determined geographic location.

These general and specific aspects may be implemented using a system, a method, or a computer program, or any combination of systems, methods, and computer programs.

Other features and advantages will be apparent from the description and drawings, and from the claims.

DETAILED DESCRIPTION

A search engine may resolve a query in a way that takes into account the requestor's geographic location. In one implementation, the search engine leverages electronic information maintained in a requestor profile to determine the geographic location of the requestor. The query run by the search engine uses the geographic information from the requestor profile to resolve the query and to generate results when matches occur. In this implementation, the requestor geographic information is obtained and used in the search process without soliciting from the user input related to geographic information.

For example, when a requestor enters a query into a search engine, a preexisting requestor profile may be accessed to obtain geographic information from the profile that is used to generate a result to the query. In this manner, existing information known about the requestor may be leveraged to deliver relevant query results to the requestor. More specifically, for example, the preexisting requestor profile may contain a zip code or other geographic information associated with the requestor. When the requestor submits a search, the zip code or other geographic information is automatically obtained from the preexisting requestor profile and used in the search process to generate search results that are geographically relevant to the requestor. The preexisting requestor profile typically is used by more than one program.

In one implementation, a requestor search profile may be created by automatically obtaining geographic information from the preexisting requestor profile. The information contained in the created requestor search profile then may be leveraged when the requestor performs a search.

Figure 1:
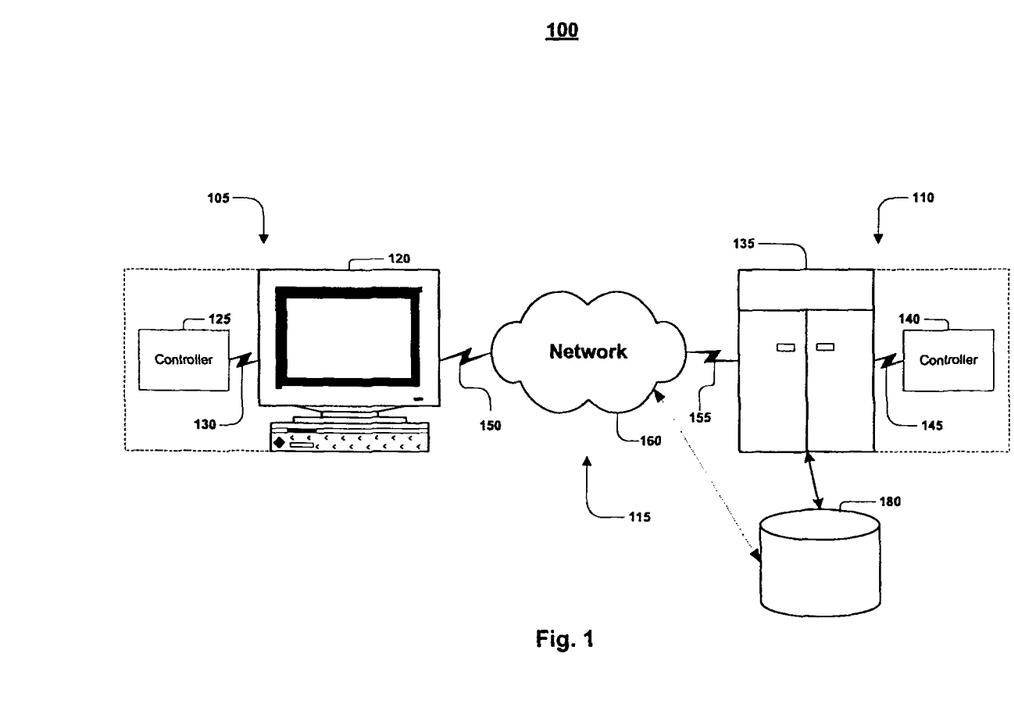
FIG. 1 is a block diagram of a communications system.
Figure 2:
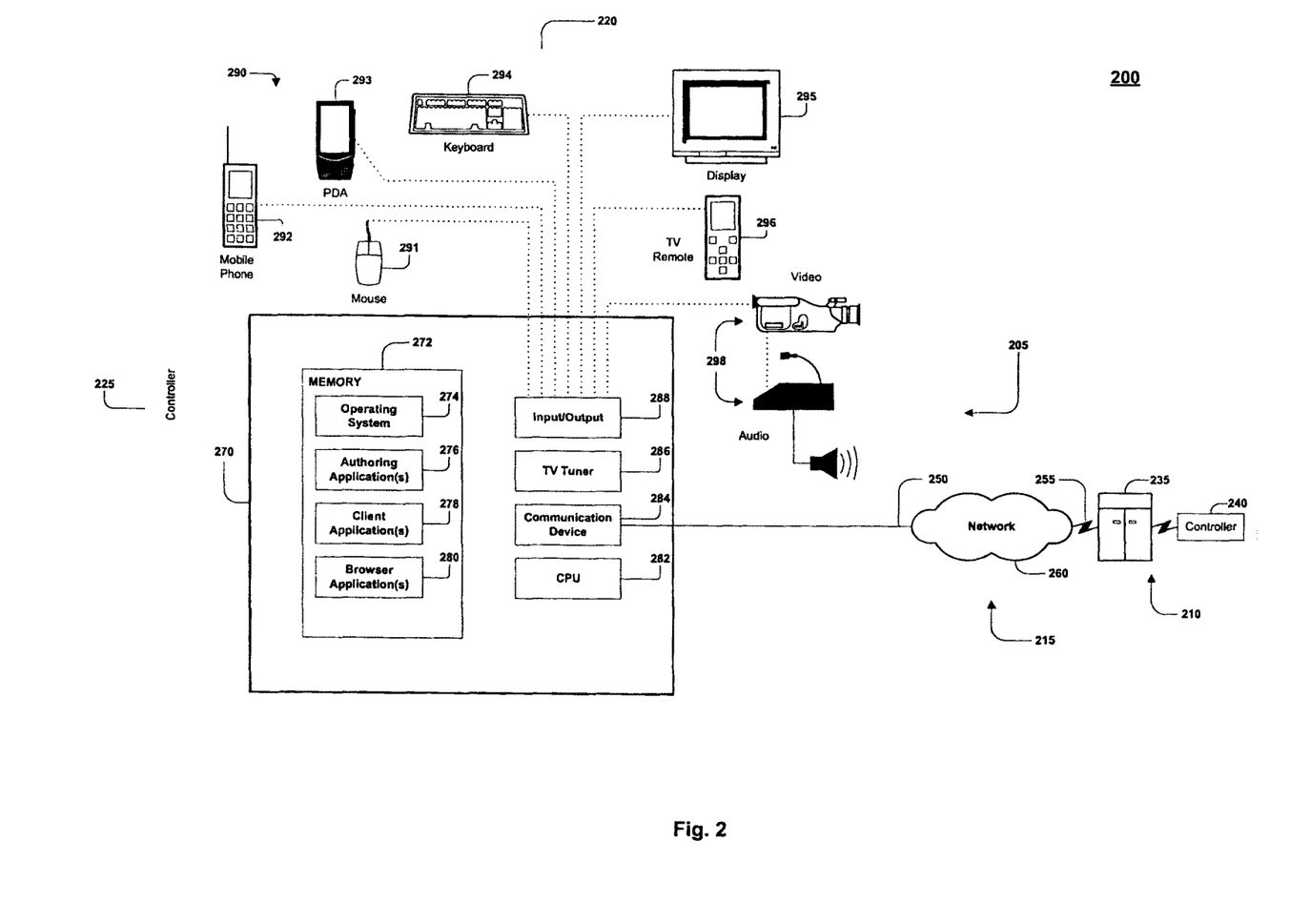
FIG. 2 is an expansion of the block diagram of FIG. 1.

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requestor system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more LANs ("Local Area Networks") and/or one or more WANs ("Wide Area Networks").

The requestor device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requestor controller 125, the provider device 135, and the provider controller 140 each typically includes one or more hardware components and/or software components. An example of a requestor device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requestor device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requestor device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information that may be in an indexed and/or searchable format.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requestor device 220 by accessing the delivery network 260 and communicating with the provider system 210. Furthermore, the requestor system 205 may include one, some or all of the components and devices described above.

Figure 3:
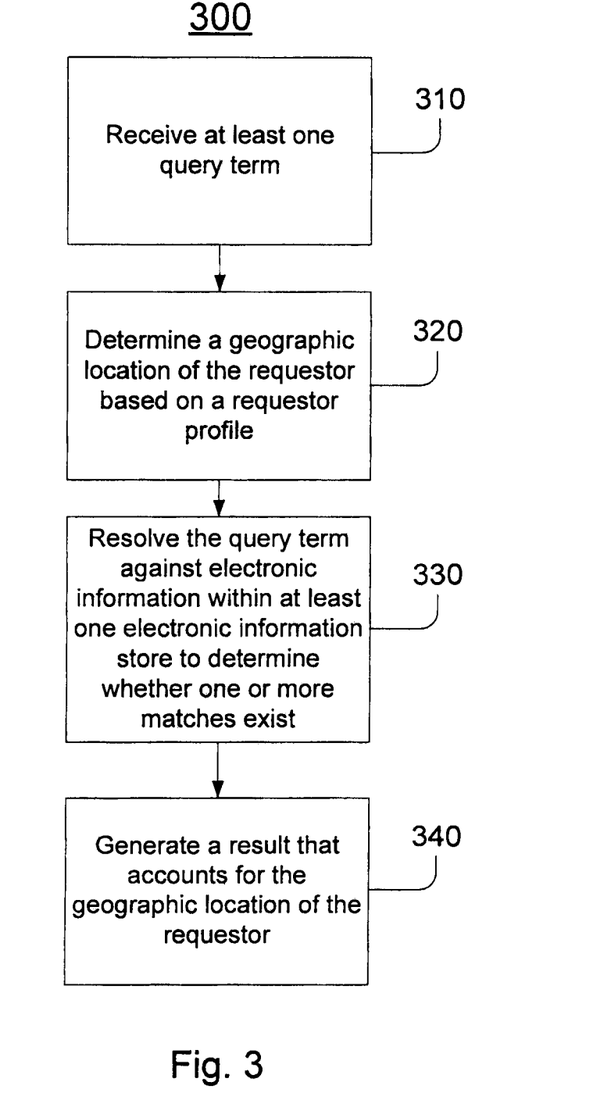
FIGS. 3-6 are flow charts of exemplary processes for identifying electronic information implemented by the communications system of FIGS. 1 and 2.

Referring to FIG. 3, an exemplary process 300 may be used to resolve query terms for a search for electronic information (e.g., a search for information on the Internet or a search of proprietary electronic information) and/or a keyword search for electronic information. Process 300 typically includes receiving at least one query term (step 310) and determining a geographic location of the requestor (step 320). The geographic location of the requestor typically is determined by accessing an electronic information store containing a requestor profile including geographic information about the requestor, where the requestor profile is used by more than one program. The query term is resolved against electronic information within at least one electronic information store to determine whether one or more matches exist (step 330) and a result is generated that accounts for the geographic location of the requestor (step 340).

The geographic information may include information related to an address, such as a street name, a city, a state, a country, and/or a zip code. The geographic information also may include information related to a phone number, such as an area code. Other types of geographic information may include geographic coordinates (e.g., latitude and longitude), a continent, a country, a region, a major metropolitan area, a local metropolitan area, a state, a local city, and/or a local neighborhood.

When more than one query term is received (step 310), the query terms may be grouped by default as a single string, or they may be grouped in other ways. Query terms typically are received from a requestor system 105 or 205 as shown and described in FIGS. 1 and 2. Query terms generally include text defined by letters and/or numbers. However, a query term also may include other searchable content, such as symbols, other alphanumeric characters, and geometric constructs (e.g., arcs); Boolean operators (e.g., AND, OR, ADJ, NOT, NEAR) generally used to define relationships between query terms; parentheses and quotation marks generally used to indicate precision and to group query terms; wild card characters (e.g., ? and *) generally used to represent a portion of a query term; and concept operators (e.g., !) generally used to broaden a query term or phrase to a list of related words related to the query term or phrase in order to resolve the query term against electronic information using these related words.

When the geographic location of the requestor is determined (step 320), the geographic location may be determined by accessing an electronic information store containing a requestor profile that includes geographic information about the requestor, where the requestor profile is used by more than one program. In one implementation, the requestor profile may be used by more than one program type.

In one implementation, the information contained in the requestor profile may include information that was previously obtained about the requestor and that was created for a purpose other than for use in determining the geographic location for resolving a query. For example, the information in the requestor profile may include information that was obtained about the requestor during the subscription process for services from an online service provider or an Internet service provider (ISP). Such information may include demographic information about the requestor including, for example, a user identity's name, billing address, electronic mail (e-mail) address, phone number, gender, date of birth, and other demographic information. From the information provided by the requestor, such as address information, other geographic location information fields in the requestor profile may be populated automatically. For example, if the requestor provides a city/state and/or a zip code, then other types of geographic information may be determined and populated within the requestor profile. The other types of geographic location information may include, for example, geographic coordinates (e.g., latitude and longitude), a continent, a country, a region, a major metropolitan area, a local metropolitan area, and/or a local neighborhood.

In one implementation, a geocode may be created automatically from the information contained in the requestor profile and associated with the requestor. For example, a geocode may be constructed based on a geographic taxonomy of different geographic nodes, where each node is assigned a code resulting in a string that forms the geocode. One exemplary geographic taxonomy may include the following geographic nodes: continent<country<region<major metropolitan area<local metropolitan area<state<local city<local neighborhood. Thus, the requestor's geocode may be used during the search process to generate geographically relevant results. In one implementation, web sites and web pages on the Internet also may be associated with a geocode, which may be used to help obtain geographically relevant matches to a search query based on the geographic location of the requestor.

In one implementation, the geocode may be used to broaden and/or narrow the geographic scope of the search. For instance, the geocode may be used to define the scope of the geography of a physical address contained in a web site, thus making searches more robust. Likewise, the geocode may be used to define the scope of the geography of a physical address associated with a particular requestor.

In another implementation, the information in the requestor profile may include information that was obtained about the requestor during an online purchasing transaction and/or information that was obtained based on monitoring requestor interactions over the communication network, such as requestor browsing and purchasing habits.

In yet another implementation, the geographic location of the requestor may be determined by determining the Internet protocol (IP) address or service provider gateway used by the requestor and determining the geographic location of the requestor based on the IP address or the location of the service provider gateway.

In this manner, information previously obtained for purposes not related to satisfying user queries, and before not useful for such purpose, may be leveraged to help generate or at least present results that are more relevant or more relevantly ordered for the searcher.

When query term is resolved against electronic information within at least one electronic information store to determine whether one or more matches exist (step 330), the electronic information store may include any type of information stored and/or maintained by an electronic information store that may be indexed and/or searchable. When the result is generated that accounts for the geographic location (step 340), the result may be filtered and/or ranked based on the determined geographic location of the requestor. The result may be displayed.

The determined geographic location may be used in different ways to effect the outcome of the query term search. In an exemplary implementation, the geographic location is used as part of the search to be resolved against electronic information within the electronic information store. In another exemplary implementation, the geographic location is not included as part of the search, but the results from the query term search are filtered based on the geographic location. In another exemplary implementation, the geographic location is not included as part of the search, but the results from the query term search are sorted for presentation based on the geographic location. In yet another exemplary implementation, the geographic location is used as part of the search and the geographic location also is used to sort the results so that results with the highest geographic relevance are presented first, even among search results obtained based on geographic data. Some of these exemplary implementations are illustrated below in FIGS. 4-6.

Figure 4:
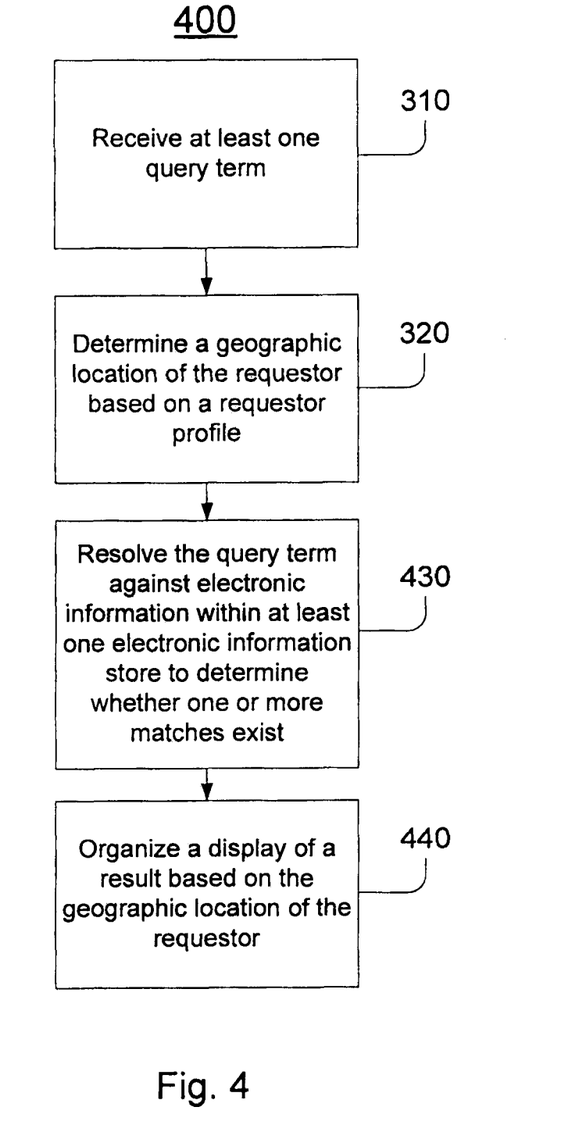

FIG. 4 illustrates another exemplary process 400 for identifying electronic information based on a query term, where the geographic location of the requestor is used to organize search results. In this exemplary implementation, process 400 includes receiving at least one query term (step 310) and determining a geographic location of the requestor based on a requestor profile including geographic information about the requestor (step 320). The query term is resolved against electronic information within at least one electronic information store to determine whether one or more matches exist (step 430), and a display of a result is organized based on the geographic location of the requestor (step 440).

In exemplary process 400, steps 310 and 320 of FIG. 4 are comparable to steps 310 and 320 described above with respect to FIG. 3. In this exemplary implementation, the query term is resolved against the electronic information (step 430) and any resulting matches are organized based on the geographic location of the requestor (step 440). For example, the result may be organized by filtering and/or ranking the results based on the geographic location of the requestor (step 440).

For example, the query term "carry out pizza" may be entered in a GUI and received for resolving against the electronic content accessible through the GUI (step 310). In this example, the geographic location of the requestor is determined to be Dulles, Va. based on geographic information contained in the requestor profile and is not used to filter the electronic content (step 320). Instead, the query term "carry out pizza" is resolved against the electronic content (step 430) and then the geographic location of the requestor is used to organize any resulting matches by organizing and/or ranking the results (step 440). In this example, the results are ranked based on the geographic location of the requestor such that carry out pizza results related to Dulles, Va., are at the top of the results list and results related to geographic areas most proximate to Dulles, and so forth.

In one implementation, an algorithm may be used to determine the ranking of results that accounts for the different possible relevancy situations that may occur. For example, the algorithm accounts for situations where there are a high number of relevant results based on the query term resolution, but of those results obtained, there is a low relevancy to the geographic location of the requestor. In this exemplary situation, the results may be ranked based on the closest proximity to the geographic location of the requestor, with the results having the closest proximity to the actual geographic location of the requestor being displayed first. In another example, the algorithm accounts for situations where there are a low number of relevant results based on the query term resolution and, of those results obtained, there is a high relevancy to the geographic location of the requestor. In this exemplary situation, the most relevant results based on the query term with the closest proximity to the geographic location of the requestor may be displayed first.

Figure 5:
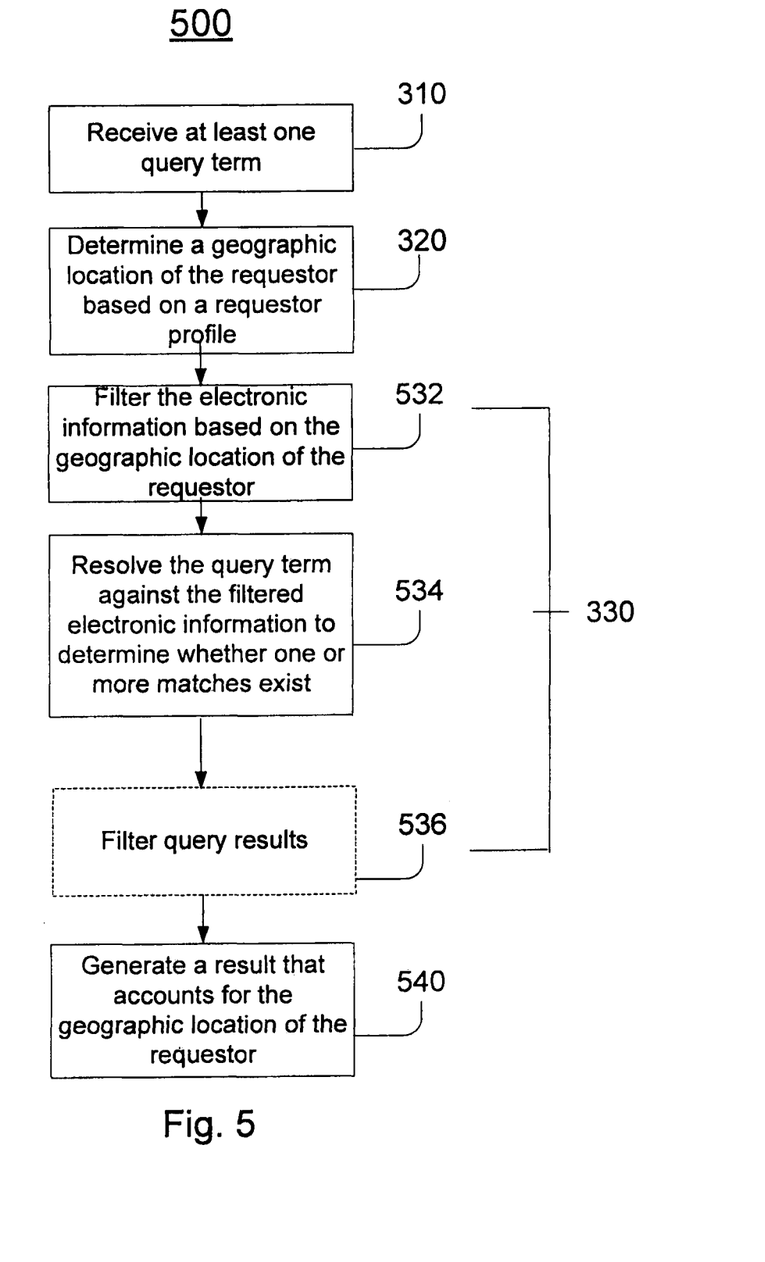

FIG. 5 illustrates another exemplary process 500 for identifying electronic information based on a query term in which the geographic location of the requestor as determined from a requestor profile is used as a filter. In this exemplary implementation, the process 500 includes receiving at least one query term (step 310) and determining a geographic location of the requestor (step 320). The electronic information is filtered based on the geographic location of the requestor (step 532). The query term is resolved against the filtered electronic information to determine whether one or more matches exist (step 534) and a result is generated that accounts for the geographic location of the requestor (step 340).

In exemplary process 500, steps 310, 320, and 340 of FIG. 5 are comparable to steps 310, 320, and 340 described above with respect to FIG. 3. Steps 532, 534, and 536 are an exemplary modification or amplification of step 330 described above with respect to FIG. 3. The process 500 differs in that the geographic location of the requestor may be used to narrow the field of candidates against which the query term will be applied before resolution of the query term (step 532). For instance, subcategories appropriate for the geographic location of the requestor may be selected to filter the universe of potentially searchable electronic information based on the geographic location of the requestor. In this manner, the results include only the electronic information that matches the requestor's geographic location.

For example, the query term "carry out pizza" may be entered in a GUI and received for resolving against the electronic content accessible through the GUI (step 310). In this example, the geographic location of the requestor is determined to be Dulles, Va., based on geographic information contained in the requestor profile (step 320). The geographic location of the requestor is used to filter the electronic content based on the geographic location of the requestor before the query term "carry out pizza" is resolved against the electronic content (step 532). After the geographic location of the requestor is used to filter the electronic content (step 532), the query term is resolved against remaining and geographically relevant the electronic content (step 534). In this example, the results are then displayed where the geographic location of the requestor was taken into account before the query term was resolved.

A similar approach may involve using the geographic location of the requestor to filter results of a search conducted based on the requestor's geographic location (see optional step 536 that may be used instead of step 532). For example, the geographic location of the requestor may be taken into account after the query term is resolved and the results are filtered based on the geographic location of the requestor. For instance, the results to the query term "carry out pizza" may be filtered based on the geographic location of the requestor before being perceived by the requestor so that only the results that are relevant to the geographic location are perceived.

Figure 6:
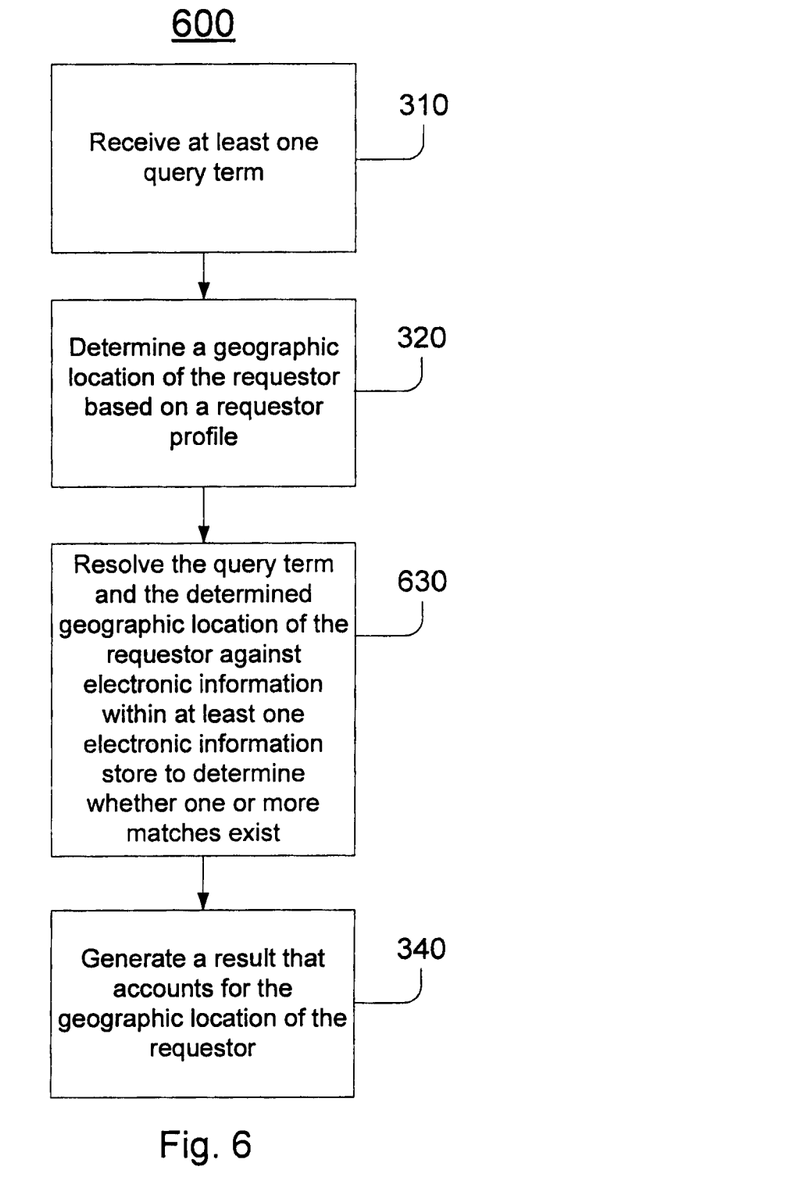

FIG. 6 illustrates another exemplary process 600 for identifying electronic information based on a query term, where the geographic location of the requestor is used as part of the query term. In this exemplary implementation, process 600 includes receiving at least one query term (step 310) and determining a geographic location of the requestor based on a requestor profile including geographic information about the requestor (step 320). The query term and the determined geographic location of the requestor are resolved against electronic information within at least one electronic information store to determine whether one or more matches exist (step 630), and a result is generated that accounts for the geographic location of the requestor (step 340).

In exemplary process 600, steps 310, 320, and 340 of FIG. 6 are comparable to steps 310, 320, and 340 described above with respect to FIG. 3. In one implementation, the geographic location is resolved against electronic information within the electronic information store (step 630). For example, the electronic information may be designated, associated, identified, and/or tagged (e.g., the information may be a metatag and/or a geographic identification (geo ID) code that has been manually or automatically generated) with a geographic reference such that the determined geographic location (step 320) may be resolved against the geographic reference along with the query term. In this instance, different results to the same query term may be obtained for different requestors based on different geographic locations of the requestors. For example, a search engine may include a graphical user interface (GUI) to enter a query term to be resolved against the content available on the Internet. If the query term "carry out pizza" is entered by a requestor whose geographic location is determined to be Dulles, Va., then the query may be resolve to one or more matches for a web site related to carry out pizza in Dulles, Va. However, if the same query is entered by a requestor whose geographic location is determined to be Virginia Beach, Va., then the query may resolve to one ore more matches for a web site related to carry out pizza located in Virginia Beach, Va.

In another exemplary implementation, in addition to the geographic location of the requestor being resolved against electronic information along with the query term to determine whether one or more matches exist (step 630), the geographic location also may be used to filter the results (step 536) and/or organize a display of the results (step 440).

Referring back to FIG. 3, in another exemplary implementation, the query term may be resolved (step 630) by performing keyword resolution using the query term. The keyword resolution may be enhanced using the geographic location as an additional search criterion, as described above. In another implementation, the query may be resolved (step 330) by performing a search for recommended websites, with or without taking the geographic location of the requestor into consideration, and filtering the result of the search based on the geographic location of the requestor. Recommended web sites may include premium web sites and/or secondary search results which may accompany a more general listing of non-premium web sites.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

For example, the requestor may override the determined geographic location that is used for resolving a query term. The requestor may be presented with one or more options to change the determined geographic location that is accessed from the requestor profile to a different geographic location to be used for resolving a query term.

In another exemplary implementation, the requestor may disable and/or override a geocode associated with the requestor and that may be used for resolving a query term.

What is claimed is:

1. A method of providing an ordered list of search results, comprising:
   determining network information that is associated with a requestor of a search query, the network information including a location of a service provider gateway used by the requestor and through which the search query is made, the search query including a search term;

determining a geographical area associated with a requestor using the determined network information, which includes the location of the service provider gateway used by the requestor;

generating search results associated with the search term and the geographical area, the generated search results including (i) first search results relevant to the search term and (ii) second search results relevant to the geographical area; and ordering the search results for display by:
  weighting the first search results more than the second search results when a number of the first search results is less than a number of the second search results;
  weighting the second search results more than the first search results when a number of the first search results is more than a number of the second search results; and
  ordering the search results for display based on the weighting of the first search results and the weighting of the second search results, wherein the determining a geographical area comprises accessing a profile of the requestor, and wherein the profile is accessed by at least one of a first program to order the search results and a second program performing a function unrelated to ordering the search results.

2. The method of claim 1, wherein the weighting the first search results more than the second search results comprises generating an ordered list based on a comparison of relative subject matter relevancy of the search results.

3. The method of claim 1, wherein the determining a geographical area comprises determining the geographical area without soliciting geographic location information from the requestor.

4. The method of claim 1, wherein the profile is a preexisting one that was created for a purpose other than ordering the search results.

5. The method of claim 1, further comprising:
  determining a geocode based on the geographical area; and
  associating the geocode with the requestor.

6. A method of providing an ordered list of search results, comprising:
  determining network information that is associated with a requestor of a search query, the network information including a location of a service provider gateway used by the requestor and through which the search query is made, the search query including a search term;
  determining a geographical area associated with a requestor using the determined network information, which includes the location of the service provider gateway used by the requestor;
  generating search results associated with the search term and the geographical area, the generated search results including (i) first search results relevant to the search term and (ii) second search results relevant to the geographical area; and
  ordering the search results for display by:
    weighting the first search results more than the second search results when a number of the first search results is less than a number of the second search results;
    weighting the second search results more than the first search results when a number of the first search results is more than a number of the second search results; and
    ordering the search results for display based on the weighting of the first search results and the weighting of the second search results,
  wherein the weighting the second search results more than the first search results comprises generating an ordered list based on a comparison of relative geographic proximity of the search results.

7. A hardware-based system for providing an ordered list of search results, comprising:
  a providing section that
    determines network information that is associated with a requestor of a search query, the network information including a location of a service provider gateway used by the requestor and through which the search query is made, the search query including a search term,
    determines a geographical area associated with a requestor using the determined network information, which includes the location of the service provider gateway used by the requestor,
    generates search results associated with the search term and the geographical area, the generated search results including (i) first search results relevant to the search term and (ii) second search results relevant to the geographical area, and
    orders the search results for display by:
      weighting the first search results more than the second search results when a number of the first search results is less than a number of the second search results;
      weighting the second search results more than the first search results when a number of the first search results is more than a number of the second search results; and
      ordering the search results for display based on the weighting of the first search results and the weighting of the second search results; and
  a receiving section that receives the search results, after the providing section orders the search results,
  wherein the search result providing section determines a geographical area comprises accessing a profile of the requestor, the profile including data associated with the geographical area, and
  wherein the profile is accessed by at least one of a first program to order the search results and a second program performing a function unrelated to ordering the search results.

8. The system of claim 7, further comprising receiving, from the requestor, an indication to override the determined geographical area with an override geographic area, and wherein the second search results are relevant to the override geographic area.

9. The system of claim 7, wherein the weighting the first search results more than the second search results comprises generating an ordered list based on a comparison of relative subject matter relevancy of the search results.

10. The system of claim 7, wherein the search result providing section determines a geographical area comprises determining the geographical area without soliciting geographic location information from the requestor.

11. The system of claim 7, wherein the profile is a preexisting one that was created for a purpose other than ordering the search results.

12. The system of claim 7, wherein the search result providing section:
  determines a geocode based on the geographical area; and
  associates the geocode with the requestor.

13. The 7 stem of claim 10, wherein search result providing section receives, from the requestor, an indication to override the determined geographical area with an override geographic area, and wherein the second search results are relevant to the override geographic area.

14. A hardware-based system for providing an ordered list of search results, comprising:
   a providing section that
      determines network information that is associated with a requestor of a search query, the network information including a location of a service provider gateway used by the requestor and through which the search query is made, the search query including a search term,
      determines a geographical area associated with a requestor using the determined network information, which includes the location of the service provider gateway used by the requestor,
      generates search results associated with the search term and the geographical area, the generated search results including (i) first search results relevant to the search term and (ii) second search results relevant to the geographical area, and
      orders the search results for display by:
         weighting the first search results more than the second search results when a number of the first search results is less than a number of the second search results;
         weighting the second search results more than the first search results when a number of the first search results is more than a number of the second search results; and
         ordering the search results for display based on the weighting of the first search results and the weighting of the second search results; and
   a receiving section that receives the search results, after the providing section orders the search results,
   wherein the weighting the second search results more than the first search results comprises generating an ordered list based on a comparison of relative geographic proximity of the search results.

15. A method of providing an ordered list of search results, comprising:
   determining a geographical area of a requestor using a location of a service provider gateway through which a search query, which includes a search term, is made;
   generating search results associated with the search term and the geographical area, the generated search results including first search results relevant to the search term and second search results relevant to the geographical area; and
   ordering the search results for display by:
      weighting the first search results more than the second search results when a number of the first search results is less than a number of the second search results;
      weighting the second search results more than the first search results when a number of the first search results is more than a number of the second search results, and
      ordering the search results for display based on the weighting of the first search results and the weighting of the second search results,
   wherein the weighting the second search results more than the first search results comprises generating an ordered list based on a comparison of relative geographic proximity of the search results.

16. The method of claim 15, wherein the weighting the first search results more than the second search results comprises generating an ordered list based on a comparison of relative subject matter relevancy of the search results.

* * * * *